(12) United States Patent  
Ishikawa

(10) Patent No.: US 8,910,545 B2  
(45) Date of Patent: Dec. 16, 2014

(54) WAVE GEAR DEVICE PROVIDED WITH TAPERED FLEXIBLE EXTERNALLY TOOTHED GEAR

(75) Inventor: Shoichi Ishikawa, Kanagawa (JP)

(73) Assignee: Harmonic Drive Systems, Inc., Tokyo (JP)

( * ) Notice: Subject to any disclaimer, the term of this patent is extended or adjusted under 35 U.S.C. 154(b) by 326 days.

(21) Appl. No.: 13/482,091

(22) Filed: May 29, 2012

(65) Prior Publication Data

US 2012/0304791 A1 Dec. 6, 2012

(30) Foreign Application Priority Data

Jun. 1, 2011 (JP) ................................ 2011-123828

(51) Int. Cl.
  *F16H 1/32* (2006.01)
  *F16H 49/00* (2006.01)
  *F16H 55/08* (2006.01)

(52) U.S. Cl.
  CPC .......... *F16H 49/001* (2013.01); *F16H 55/0833* (2013.01)
  USPC ........................................................... 74/640

(58) Field of Classification Search
  CPC ..................................................... F16H 49/001
  USPC ........................................... 74/461, 462, 640
  See application file for complete search history.

(56) References Cited

U.S. PATENT DOCUMENTS 2,906,143 A 9/1959 Musser
7,328,632 B2 * 2/2008 Ishikawa ........................ 74/640

FOREIGN PATENT DOCUMENTS

| JP | 45-41171 | 12/1970 |
| JP | 63/115943 A | 5/1988 |
| JP | 64-079448 A | 12/2005 |
| WO | WO 2005/124189 A1 | 12/2005 |
| WO | WO 2010/070712 A1 | 6/2010 |

* cited by examiner

*Primary Examiner* — William C Joyce

(57) ABSTRACT

In an elliptical rim neutral line of each axially perpendicular cross section in a tooth trace direction of a flexible externally toothed gear of a wave gear device, external teeth are applied with addendum modification along the external teeth tooth trace direction so that the bending stress generated at the root rim surface of the external teeth that is caused by flexing of the flexible externally toothed gear is averaged out, the maximum value thereof can be reduced, and the transferred torque of the wave gear device can be increased.

3 Claims, 3 Drawing Sheets

WAVE GEAR DEVICE PROVIDED WITH TAPERED FLEXIBLE EXTERNALLY TOOTHED GEAR

BACKGROUND OF THE INVENTION

1. Field of the Invention

The present invention relates to a wave gear device equipped with a tapered flexible externally toothed gear that can reduce the bending stress generated at the root-rim surface of the flexible externally toothed gear and increase transferred torque.

2. Description of the Related Art

Since its invention (Patent Document 1) by C. W. Musser until now, the wave gear device has had a variety of inventions and designs of the present device made by many researchers including the present inventor. There is a variety of inventions relating only to the tooth profile. For example, the present inventor proposes having the basic tooth profile to be an involute tooth profile in Patent Document 2, and proposes a tooth profile design method for defining the addendum tooth profile of a rigid internally toothed gear and a flexible externally toothed gear for performing wide-area contact using a method for approximating the meshing of the teeth of both gears with a rack in Patent Documents 3, 4.

In general, a wave gear device has an annular rigid internally toothed gear, a flexible externally toothed gear coaxially arranged on the inside of the internally toothed gear, and a wave generator fitted to the inside of the externally toothed gear. The flexible externally toothed gear comprises a flexible cylindrical part, a disk-shaped diaphragm extending in the radial direction from the rear end of the cylindrical part, and external teeth formed on the external peripheral surface of the front end opening side of the cylindrical part. The front end opening side portion of the cylindrical part of the flexible externally toothed gear is made to elliptically flex by the wave generator, and the external teeth at the two end parts along a direction of the major axis of the elliptical curve mesh with the internal teeth of the rigid internally toothed gear.

The external teeth of the flexible externally toothed gear that is elliptically flexed has increased flexing amount from the diaphragm side to the front end opening along the tooth trace direction. Each portion of the teeth of the flexible externally toothed gear repeats flexing in the radial direction in association with the rotation of the wave generator. The present inventor proposes a method for setting the tooth profile with consideration given to such flexing motions (coning) of the flexible externally toothed gear by the wave generator in Patent Document 5.

In the wave gear device proposed in Patent Document 5, an arbitrary axially perpendicular cross-sectional position of the tooth trace direction of the flexible externally toothed gear is defined to be a primary cross section, and a tooth profile of the flexible externally toothed gear and the rigid internally toothed gear that is able to continually mesh at the primary cross section are formed. Assuming the flexing amount of the external teeth of the flexible externally toothed gear to be proportionate to the distance from the diaphragm from rear end of the diaphragm side to the front end opening, addendum modification is applied on the portions of the external teeth other than the primary cross section in accordance with the flexing amount, and interference of tooth profiles of both gears is avoided.

In Patent Document 6, the present inventor proposes the use of a conical tooth profile for the external teeth of the flexible externally toothed gear to avoid interference of tooth profiles of both gears caused by the flexing of the flexible externally toothed gear at the locations other than the axially perpendicular cross section (primary cross section) defined at a predetermined position of the tooth trace direction of the flexible externally toothed gear of the wave gear device.

[Patent Document 1] U.S. Pat. No. 2,906,143
[Patent Document 2] JP-B 45-41171
[Patent Document 3] JP-A 63-115943
[Patent Document 4] JP-A 64-79448
[Patent Document 5] WO 2010/070712
[Patent Document 6] WO 2005/124189

SUMMARY OF THE INVENTION

There is presently a strong market demand for an improvement in load torque performance in a wave gear device. Accomplishing this particularly requires an improvement in strength of the flexible externally toothed gear.

To solve the above problem, the wave gear device of the present invention was devised to average out and reduce bending stress generated at the root-rim surface of the external teeth caused by the flexing of the flexible externally toothed gear. In doing so, addendum modification of teeth with consideration given to coning of the flexible externally toothed gear is applied.

The wave gear device of the present invention has a rigid internally toothed gear, a cup-shaped or silk hat-shaped flexible externally toothed gear on the inside of the internally toothed gear, and a wave generator for flexing the flexible externally toothed gear into an elliptical shape to cause the flexible externally toothed gear to partially mesh with the rigid internally toothed gear. The position at which the two gears mesh moves in a circumferential direction when the wave generator rotates, and a relative rotation is generated between the two gears in correspondence with the difference in the number of teeth of the two gears. For each axially perpendicular cross section in the tooth trace direction of the flexible externally toothed gear that is flexed into an elliptical shape by the wave generator, flexing that is proportionate to its distance from the diaphragm is generated at a position on a major axis of the elliptical curved line of flexible externally toothed gear as it progresses from the rear end of the diaphragm side of the flexible externally toothed gear to the front end opening of the flexible externally toothed gear. In the elliptical rim neutral line of each axially perpendicular cross section in the tooth trace direction of the flexible externally toothed gear, the product tw of t and w is set so as to be constant in each axially perpendicular cross section of the tooth trace direction in the external teeth of the flexible externally toothed gear, where w=κmn (where m is the module of the teeth of both gears, n is ½ of the difference in the number of teeth between the rigid internally toothed gear and the flexible externally toothed gear, and κ is the flexing coefficient), and t is the rim thickness of the axially perpendicular cross section. The external teeth of the flexible externally toothed gear are subjected to addendum modification in the tooth trace direction thereof to satisfy this relation. The root shape in the tooth trace direction of the external teeth obtained in this manner is prescribed by a theoretical root curved line that satisfies the above relation.

It is desirable, from a perspective of tooth profile processing, for the root shape in the tooth trace direction of the external teeth to be prescribed by a root straight line that is approximate to the theoretical root curved line of the external teeth that satisfies the relation in which the product of the root rim thickness t and the flexing amount w is constant. The approximate root straight line is a line tangent to the theoretical root curved line, the tangent line being drawn to a point on the theoretical root curved line that corresponds to a position in the tooth width center of the external teeth.

In accordance with the present invention, in each axially perpendicular cross section in the tooth trace direction of the flexible externally toothed gear of the wave gear device, the bending stress generated at the root rim surface by the flexing of the elliptical rim neutral line in the major axis direction can be averaged and its maximum value can be reduced. Accordingly, a wave gear device that can transmit greater torque via the flexible externally toothed gear can be attained.

DESCRIPTION OF THE PREFERRED EMBODIMENTS (Configuration of the Wave Gear Device)

Figure 1:
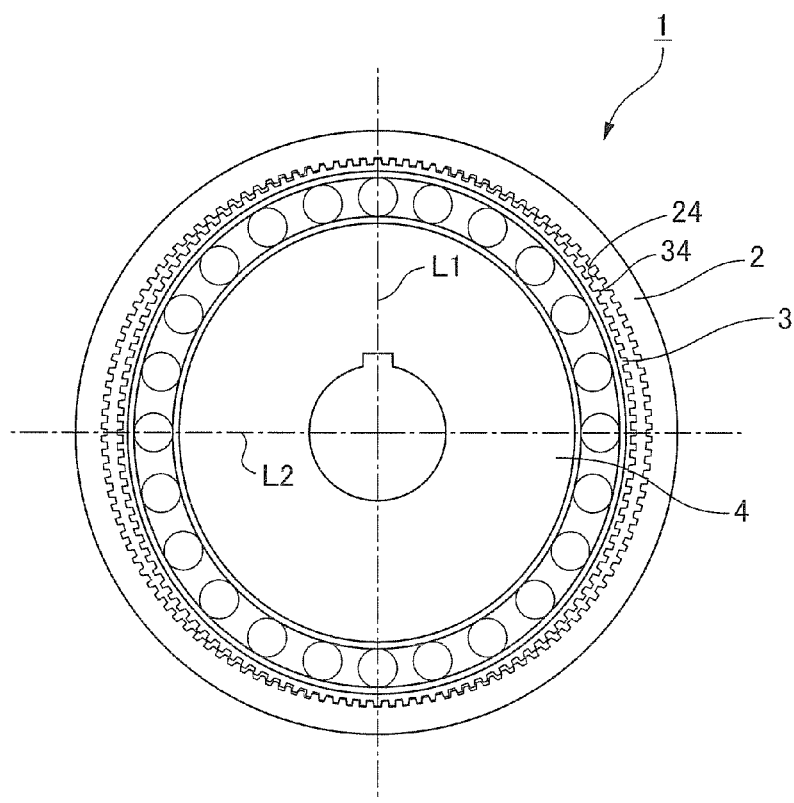
FIG. 1 is a schematic front view of a common wave gear device.
Figure 2:
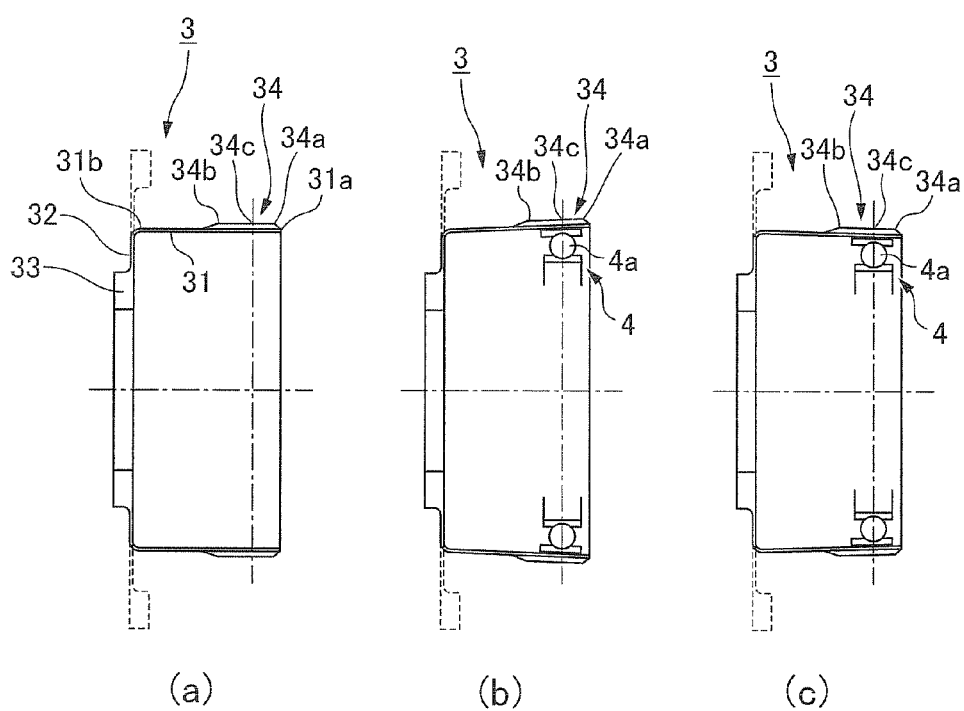
FIG. 2 is an illustrative drawing for showing the flexing state of the flexible externally toothed gear, wherein (a) shows the state of the longitudinal cross section of the flexible externally toothed gear before deforming, (b) shows the state of the longitudinal cross section in a position that includes the major axis of the flexible externally toothed gear deformed in an elliptical shape, and (c) shows the state of the longitudinal cross section in a position that includes the minor axis of the flexible externally toothed gear deformed in an elliptical shape.

The configuration of the wave gear device of the present invention and the flexing action (coning) of the flexible externally toothed gear will now be described with reference to FIGS. 1 and 2. The solid lines in FIGS. 2(a) to (c) show a cup-shaped flexible externally toothed gear, and the dash lines show a silk hat-shaped flexible externally toothed gear.

The wave gear device 1 has an annular rigid internally toothed gear 2, a flexible externally toothed gear 3 arranged on the inside of the rigid internally toothed gear, and a wave generator 4 having an elliptical profile that is fitted inside of the flexible externally toothed gear. The rigid internally toothed gear 2 and the flexible externally toothed gear 3 are both spur gears of a module m. The difference in the number of teeth of the two gears is 2n (where n is a positive integer), and the rigid internally toothed gear 2 has more teeth. The flexible externally toothed gear 3 is flexed into an elliptical shape by the wave generator 4 having an elliptical profile and meshes with the rigid internally toothed gear 2 at the two end portions of the major axis L1 direction of the ellipse. When the wave generator 4 rotates, the meshing position of the two gears 2, 3 moves in a circumferential direction, and a relative rotation in correspondence with the difference in the number of teeth of the two gears is generated between the two gears 2, 3. The flexible externally toothed gear 3 comprises a flexible cylindrical part 31, a disk-shaped diaphragm 32 extending in a radial direction continuous with the rear end 31b of the cylindrical part, a boss 33 that is continuous with the diaphragm 32, and external teeth 34 formed on the external peripheral portion of the front end opening 31a of the cylindrical part 31.

The wave generator 4 having an elliptical profile is fitted inside of an external teeth-formed portion of the front end opening 31a side in the cylindrical part 31 of the flexible externally toothed gear 3. The cylindrical part 31 that is elliptically flexed by the wave generator 4 has gradually increasing flexing amount to the outside or inside of the radial direction from the rear end 31b of the diaphragm side to the front end opening 31a. As shown in FIG. 2(b), the flexing amount to the outside gradually increases substantially proportionate to the distance from the rear end 31b to the front end opening 31a in a cross-sectional position that includes the major axis L1 (see FIG. 1) of the elliptical curved line of the cylindrical part 31; as shown in FIG. 2(c), the flexing amount to the inside gradually increases substantially proportionate to the distance from the front end opening 31a to the rear end 31b in a cross-sectional position that includes the minor axis L2 (see FIG. 1) of the elliptical curved line.

The external teeth 34 formed on the external peripheral portion of the front end opening 31a side of the cylindrical part 31 also varies in flexing amount at each axially perpendicular cross section in the tooth trace direction. The flexing amount gradually increases substantially proportionate to the distance from the rear end 31b in the tooth trace direction of the external teeth 34 from the rear end 34b of the diaphragm side to the front end 34a of the front end opening 31a side within a cross section that includes the major axis L1 of the elliptical curved line.

In an axially perpendicular cross section of any position in the tooth trace direction of the external teeth 34, a circle that passes through the center of the thickness direction of the root rim of the external teeth 34 prior to being elliptically flexed is a rim neutral circle. In contrast, the curved line that passes through the center of the thickness direction of the root rim after being elliptically flexed is referred to as an elliptical rim neutral line. In the major axis position of elliptical rim neutral line, the flexing distance in the major axis direction relative to the rim neutral circle is $2\kappa mn$, where $\kappa$ is the flexing coefficient.

$Z_F$ is the number of teeth of the external teeth 34 of the flexible externally toothed gear 3, $Z_C$ is the number of teeth of the internal teeth 24 of the rigid internally toothed gear 2, R $(=Z_F/(Z_C-Z_F)=Z_F/2n)$ is the speed reduction ratio of the wave gear device 1, and the value $(mZ_F/R=2\,mn)$ obtained by dividing the pitch circle diameter $mZ_F$ of the flexible externally toothed gear 3 by the speed reduction ratio R is the normal flexing distance $w_O$ in the major axis direction. The wave gear device 1 is generally designed to flex at its normal flexing distance $(=2\,mn)$ at a position at the ball center of the wave bearing of the wave generator 4 in the tooth trace direction of the flexible externally toothed gear 3. The flexing coefficient $\kappa$ represents a value obtained by dividing the flexing amount w by the normal flexing amount in each axially perpendicular cross section of the tooth trace direction of the flexible externally toothed gear 3. In the external teeth 34, therefore, the flexing coefficient at the position where the normal flexing amount is obtained is $\kappa=1$, the flexing coefficient at a cross section position of a flexing amount that is less than the normal flexing distance is $\kappa<1$, and the flexing coefficient at a cross section position of a flexing amount w that is greater than the normal flexing distance is $\kappa>1$.

(Shape of External Teeth)

In the present invention, an object is to reduce bending stress generated at the root rim surface of the flexible externally toothed gear 3, and to ensure that bending stress is made uniform with focus on the variation in flexing amount in the tooth trace direction of the root rim surface. The amount of addendum modification to be applied on the external teeth 34 is set as described below in correspondence with each position in the tooth trace direction of the external teeth 34 of the flexible externally toothed gear 3. That is, addendum modification is applied on the external teeth so the root curved line is prescribed by a curved line (theoretical curved line) where the root rim thickness t at each axially perpendicular cross section satisfies the expression $$t \times \kappa mn = const$$

in correspondence with the flexing coefficient κ at each axially perpendicular cross section for each axially perpendicular cross section in the tooth trace direction from the front end 34a of the external teeth 34 to the rear end 34b of the diaphragm side. This is based on a fact of material mechanics in which bending stress on the major axis is proportionate to the product of the rim thickness t and the flexing coefficient κ because the curvature changes in accordance with the flexing coefficient when a ring is deformed into an elliptical curved line.

In a preferred embodiment of the present invention, the tangent line drawn at the tooth width center of the external teeth of a curved line (theoretical curved line), in which the root rim thickness t at each axially perpendicular cross section of the external teeth 34 satisfies t×κmn=const, is used as the root straight line for prescribing the root shape in the tooth trace direction of the external teeth 34.

Figure 3:
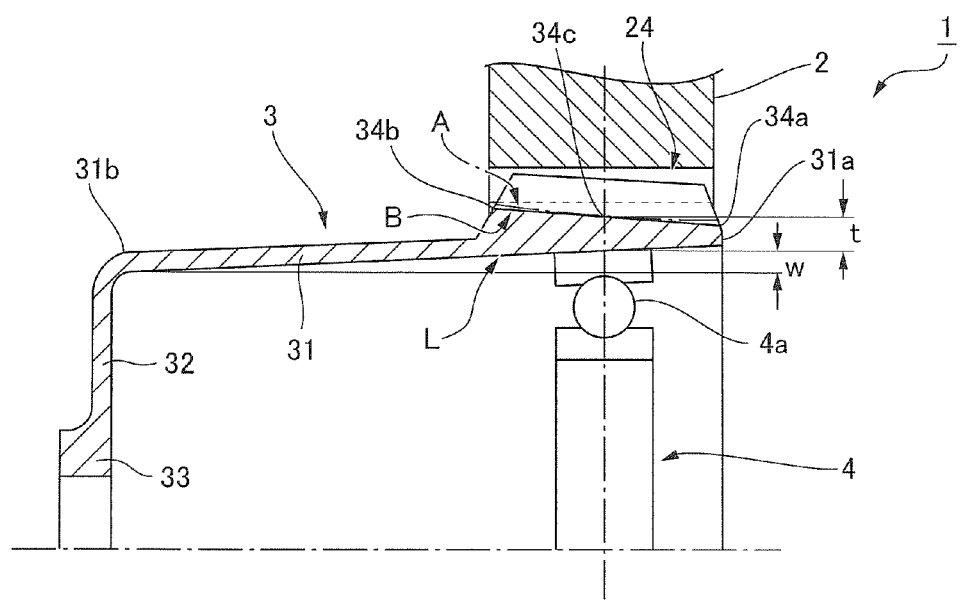
FIG. 3 is an illustrative drawing showing the shape of the teeth of the two gears of the wave gear device to which the present invention is applied.

To describe in greater detail with reference to FIG. 3, the external teeth 34 of the flexible externally toothed gear 3 are addendum-modified tooth profiles to which addendum modification has been applied so that the root rim thickness t for each axially perpendicular cross section satisfies t×κmn=const in accordance with the flexing coefficient κ at each axially perpendicular cross section for each axially perpendicular cross section in the tooth trace direction from the front end 34a to the rear end 34b.

The axial cross sectional shape of the root rim in the external teeth 34 of the flexible externally toothed gear 3 has its inside profile shape prescribed by the straight line L, and the root shape on the outside is prescribed by a root curved line A derived from the theoretical curved line that satisfies the expression t×κmn=const. The root curved line A is a curved line that is convex to the inside, and the root rim thickness t that is prescribed by the root curved line A and the straight line L on the inside is greatest at the rear end 34b of the diaphragm side, is smallest at the front end 34a, and gradually decreases in correspondence with the distance from the diaphragm between the ends.

In the root curved line A obtained in this manner, a tangent line drawn to the tooth width center of the external teeth 34 is then used as the root straight line of the external teeth 34. In the example of the drawings, the tooth width center 34c corresponds with the ball center of the wave bearing 4a of the wave generator 4. The root shape of the transpositioned (addendum-modified) tooth profile that is prescribed by the root curved line A derived from the theoretical curved line is corrected to become the root straight line B. The transpositioned tooth profile after correction that is obtained in this manner is tapered, and this is used as the tooth profile of the external teeth 34.

In the present invention, an object is to average the bending stress using the fact that, based on a formula from material mechanics, the bending stress on the major axis that is generated by the elliptical deformation of the thin, annular external teeth of the flexible externally toothed gear is proportionate to the product of its thickness and its flexing distance from its elliptical deformation, as described above. The bending stress generated in the external teeth is therefore reduced, and an increase in strength of the flexible externally toothed gear is thereby accomplished.

What is claimed is:

1. A wave gear device provided with a tapered flexible externally toothed gear, comprising:
an annular rigid internally toothed gear;
a flexible externally toothed gear coaxially arranged inside of the internally toothed gear; and
a wave generator fitted inside of the externally toothed gear, wherein
the flexible externally toothed gear is provided with a flexible cylindrical part, a disk-shaped diaphragm extending from a rear end of the cylindrical part in a radial direction, and external teeth formed on an external peripheral surface of a front end opening side of the cylindrical part;
a portion of the front end opening side of the cylindrical part is made to elliptically flex by the wave generator, and the external teeth at the two end parts in a major axis direction of an elliptical curve mesh with internal teeth of the rigid internally toothed gear; and
a flexing amount on the major axis of an elliptical curved line in the external teeth of the flexible externally toothed gear that is elliptically flexed gradually increases from a rear end of the diaphragm side to a front end of the front end opening side along a tooth trace direction of the external teeth, and wherein
the flexible externally toothed gear and the rigid internally toothed gear are both spur gears of a module m;
a number of teeth of the flexible externally toothed gear is set to have 2n less teeth than a number of teeth of the rigid internally toothed gear, where n is a positive integer;
in an axially perpendicular cross section of any position in a tooth trace direction of the external teeth, when a circle that passes through the center of the thickness direction of a root rim of the external teeth prior to being elliptically flexed is referred to as a rim neutral circle and a curved line that passes through the center of the thickness direction of the root rim after being elliptically flexed is referred to as an elliptical rim neutral line, the flexing amount w in a major axis direction of the elliptical rim neutral line relative to the rim neutral circle is w=2 κmn, where κ is a flexing coefficient; and
a product of a root rim thickness t and the flexing amount w is constant for each axially perpendicular cross section in the tooth trace direction of the external teeth.

2. The wave gear device according to claim 1, wherein addendum modification is applied to the external teeth along the tooth trace direction thereof so that the product of the root rim thickness t and the flexing amount w is constant.

3. The wave gear device according to claim 2, wherein a root shape in the tooth trace direction of the external teeth is prescribed by a root straight line that is approximate to a theoretical root curved line of the external teeth that satisfies a relation in which the product of the root rim thickness t and the flexing amount w is constant, and
the root straight line is a line tangent to the theoretical root curved line, the tangent line being drawn to a point on the root curved line that corresponds to a tooth width center of the external teeth.

* * * * *